US012717673B2

(12) United States Patent
Ambre et al.

(10) Patent No.: US 12,717,673 B2
(45) Date of Patent: Aug. 25, 2026

(54) REAL-TIME OBSERVABILITY AND ENHANCED RESILIENCY FOR EVENT PROCESSING PIPELINES

(71) Applicant: International Business Machines Corporation, Armonk, NY (US)

(72) Inventors: Tanmay Arvind Ambre, Pune (IN); Harish Bharti, Pune (IN); Amit Deshpande, Pune (IN); Nampreet Pal Singh, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/810,431

(22) Filed: Aug. 20, 2024

(65) Prior Publication Data

US 2026/0056825 A1 Feb. 26, 2026

(51) Int. Cl.

| | |
|---|---|
| ***G06F 11/00*** | (2006.01) |
| ***G06F 11/07*** | (2006.01) |
| ***G06F 11/30*** | (2006.01) |
| ***G06F 11/34*** | (2006.01) |

(52) U.S. Cl.

CPC ........ *G06F 11/079* (2013.01); *G06F 11/0793* (2013.01); *G06F 11/3072* (2013.01); *G06F 11/3476* (2013.01); *G06F 2201/805* (2013.01)

(58) Field of Classification Search

CPC ............... G06F 11/079; G06F 11/0793; G06F 11/3072; G06F 11/3476

See application file for complete search history.

(56) References Cited

U.S. PATENT DOCUMENTS

| | | | |
|---|---|---|---|
| 7,788,536 | B1 | 8/2010 | Qureshi et al. |
| 9,626,277 | B2 | 4/2017 | Thangamani et al. |
| 10,713,249 | B2 | 7/2020 | Park et al. |

(Continued)

OTHER PUBLICATIONS

Ambre, Tanmay, "Architectural considerations for event-driven microservices-based systems", IBM Developer, IBM.com, https://developer.ibm.com/articles/eda-and-microservices-architecture-best-practices/, Jul. 9, 2020, 19 pages.

(Continued)

*Primary Examiner* — Philip Guyton

(74) *Attorney, Agent, or Firm* — CHIP LAW GROUP

(57) ABSTRACT

Mechanisms are provided for generating a holistic view of an event processing pipeline of an event driven architecture. Curation of runtime information from components of an event processing pipeline is performed, where the runtime information comprises real-time runtime metrics, aggregated logs, event tracing/recording data structures, and configuration information. The curated runtime information is correlated to generate correlated runtime data. Predictive models and predictive analytics process the correlated runtime data to predict anomalies in the components of the event processing pipeline. A fault circuit interrupt machine (FCIM) processes the predicted anomalies based on user resiliency configurations to determine recommended event resiliency remediation actions for addressing the predicted anomalies. A real-time holistic view of the components of the event processing pipeline is generated based on the correlated runtime data, the predicted anomalies, and the determined recommended event resiliency remediation actions.

18 Claims, 12 Drawing Sheets

(56) References Cited

U.S. PATENT DOCUMENTS

| | | | | |
|---|---|---|---|---|
| 11,314,575 | B2 * | 4/2022 | Wang | G06N 3/006 |
| 2021/0165708 | A1 * | 6/2021 | Vijayaraghavan | G06F 11/0754 |
| 2022/0382620 | A1 * | 12/2022 | Bramble | G06F 11/0787 |
| 2023/0018199 | A1 * | 1/2023 | Mahamuni | G06F 11/3051 |

OTHER PUBLICATIONS

Anonymous, "Building Resilient Event Driven Architectures with Continuation Patterns", FasterCapital, https://fastercapital.com/content/Building-Resilient-Event-Driven-Architectures-with-Continuation-Patterns.html#:~:text=By%20separating%20the%20, Mar. 2, 2024, 23 pages.

Anonymous, "Method and System for Intelligent Early Discarding of Messages in a Service Chain That Sends Message Notifications to Avoid Unnecessary Resource Usage", IP.com Prior Art Database Technical Disclosure, IPCOM000271917D, Mar. 3, 2023, 6 pages.

Bect, Pierre et al., "Identification of abnormal events by data monitoring: Application to complex systems", Elsevier, https://www.researchgate.net/publication/272101737_Identification_of_abnormal_events_by_data_monitoring_Application_to_complex_systems, Feb. 2015, 11 pages.

R, Ranju, "How to Handle Failed Transactions in Microservices", Microservice Architecture, https://www.sayonetech.com/blog/how-handle-failed-transactions-microservices/, Dec. 9, 2023, 8 pages.

Safi, Gholamreza et al., "Detecting Event Anomalies in Event-Based Systems", ESEC/FSE 2015: Proceedings of the 2015 10th Joint Meeting on Foundations of Software Engineering, https://dl.acm.org/doi/abs/10.1145/2786805.2786836, Aug. 30, 2015, 13 pages.

White, Bill et al., "Getting Started with IBM Z Resiliency", IBM Corporation, IBM Redbooks, https://www.redbooks.ibm.com/redbooks/pdfs/sg248446.pdf, First Edition, Mar. 3, 2020, 166 pages.

* cited by examiner

| | 760 | 762 | 764 | 766 | 768 | 770 | 772 |
|---|---|---|---|---|---|---|---|
| # | INDIVIDUAL SERVICES | ALTERNATE SERVICE 1 (DIRECT INPUT FROM ERC) | BATCH OFFLOAD TOPIC DIRECT (INPUT FROM ERC) | FAIL FAST SERVIC E (DIRECT INPUT FROM ERC) | RETRIES (RANGE FROM ERC) | TIMEOUT (RANGE FROM ERC) | THROUGHPUT – INCOMING RATE/ PROCESS RATE |
| 1 | MAIN SERVICE (E.G., PAYMENT GATEWAY 1) | ALTERNATE SERVICE (PAYMENT GATEWAY 2) | NIGHTLY BATCH SERVICE (RUN BACKLOG) | CLEARMESSAGE SERVICE | 1-3 | 0.2-2 SEC. | << CAN BE LESS THAN, EQUAL, OR GREATER THAN 1>> |
| 2 | MAIN SERVICE (E.G., PAYMENT GATEWAY 2) | ALTERNATE SERVICE (PAYMENT GATEWAY 1) | NIGHTLY BATCH SERVICE (RUN BACKLOG) | CLEARMESSAGE SERVICE | 1-3 | 0.2-2 SEC. | << CAN BE LESS THAN, EQUAL, OR GREATER THAN 1>> |

*FIG. 7B*

REAL-TIME OBSERVABILITY AND ENHANCED RESILIENCY FOR EVENT PROCESSING PIPELINES

BACKGROUND

The present application relates generally to an improved data processing apparatus and method and more specifically to an improved computing tool and improved computing tool operations/functionality for real-time observability and enhanced resiliency for event processing pipelines.

Event-driven architecture (EDA) is a software design model built around the publication, capture, processing and storage of events. EDA enables teams to identify computing system events (basically any change or action that occurs within the computing system) and respond and react to them in real time (or near-real time).

The profusion of EDAs across cloud-native environments represents a significant shift away from traditional computational architectures which focus on stockpiling static data in repositories, such as in service-oriented architectures, toward a dynamic approach that tracks data as it traverses an architecture. Data is still valuable in an event-driven system, but EDAs emphasize the timely reaction to events, recognizing that the value of an event might diminish as time progresses.

In an event-driven architecture, event producers, such as microservices, Application Programming Interfaces (APIs) and Internet of Things (IoT) devices, send real-time event notifications to event consumers that then activate specific processing routines. For instance, when an entertainment streaming service releases a new original series, multiple EDA services wait on standby for the release notification, which triggers a cascade of updates to inform users.

One of the key advantages of an event-driven architecture is the decoupled relationship between front-end and back-end components, which allows systems to share information without knowing about each other. Producers can send events without knowing which consumer will receive them, and consumers can receive events without sending requests to producers. In other words, EDAs enable systems to work independently and process events asynchronously.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for generating a holistic view of an event processing pipeline of an event driven architecture. The method comprises curation of runtime information from components of an event processing pipeline. The runtime information comprises real-time runtime metrics, aggregated logs of the components of the event processing pipeline, event tracing data structures, and configuration information of the components of the event processing pipeline. The method also comprises correlating the real-time runtime metrics, aggregated logs, and event tracing data structures of the curated runtime information to generate correlated runtime data. Moreover, the method comprises processing, by predictive models and predictive analytics, the correlated runtime data to predict one or more anomalies in the components of the event processing pipeline. In addition, the method comprises processing, by a fault circuit interrupt machine (FCIM), the predicted one or more anomalies based on a user resiliency configuration to determine one or more recommended event resiliency remediation actions for addressing the predicted one or more anomalies. Furthermore, the method comprises generating and outputting a graphical user interface comprising a real-time holistic view of the components of the event processing pipeline based on the correlated runtime data, the predicted one or more anomalies, and the determined one or more recommended event resiliency remediation actions.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 7B is an example FCIM control table in accordance with one illustrative embodiment.

DETAILED DESCRIPTION

Figure 1A:
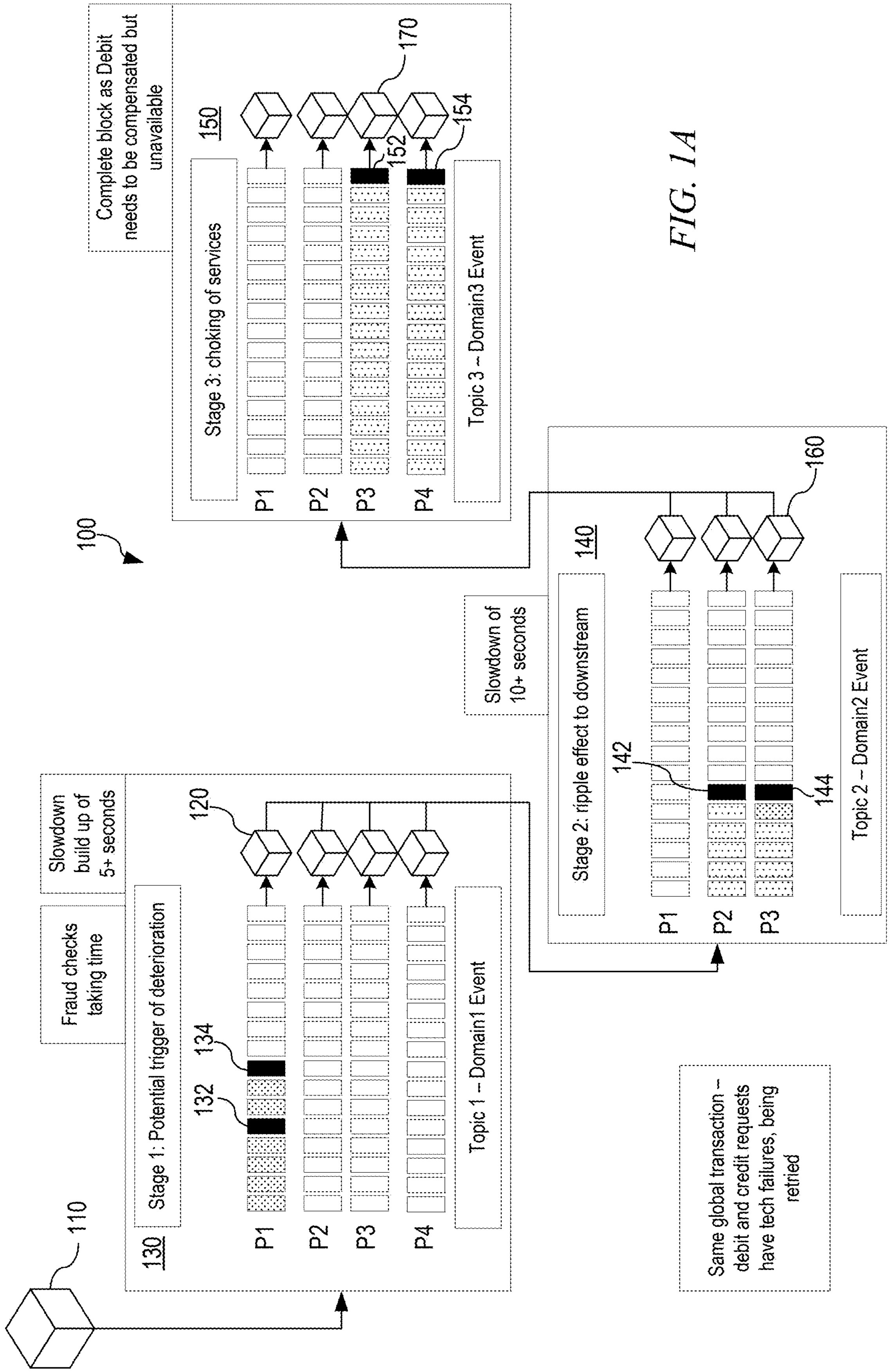
FIGS. 1A-1C are example diagrams illustrating scenarios of a slowdown build up and failures in an event driven architecture (EDA) in accordance with one or more illustrative embodiments.

The illustrative embodiments provide an improved computing tool and improved computing tool operations/functionality for real-time observability and enhanced resiliency for event processing pipelines. As mentioned above, Event Driven Architecture (EDA) provides a model for building services and/or groups of services in cloud computing systems which uses the publication, capture, processing, and storage of events and their related data as a basis for providing advanced functionality to users. Increased focus on using EDA as an architecture pattern and a mechanism for flexible, high performing, and easily extensible services has created a push to transform existing applications, e.g., web applications, to an EDA in order to leverage the improved capabilities of EDA systems.

Building EDA systems, however, involves creating large and intricate distributed event processing pipelines by composing (either through choreography or orchestration) event producers, consumers and event backbone components. Monitoring, predicting, detecting root cause of issues related to performance, throughput and availability of end-to-end event processing pipelines, and providing strategies to manage transaction integrity and functionally valid processing of events, is complex due to their distributed nature and the dependencies on runtime characteristics of components that constitute the pipeline.

Observing end to end performance of EDA systems requires acquiring and analyzing a holistic view of all runtime metrics of all components which are part of the EDA system. These could be many, with many parallel/concurrent execution paths, not like a web application which has only a few distributed components. Very few enterprises have such expertise and hence true EDA adoption has had limited success. To observe performance, components need to emit relevant metrics, which could be in the hundreds per component. These metrics need to be observed, correlated and compared with baseline values in real-time to understand the overall runtime characteristics/performance of an EDA system. Thus, creation of an EDA system is very complex and time consuming, leading to it being impractical to achieve through manual efforts.

The illustrative embodiments provide a method to combine Application Performance Monitoring (APM) analytics, log aggregation, and event tracing to build a holistic view of runtime characteristics of a component. APM is a comprehensive approach to monitoring and analyzing the performance of software applications which enables real-time insights into critical performance metrics, bottleneck detection, and proactive addressing of issues that impact user experience and outcomes. The illustrative embodiments combine runtime characteristics, obtained through APM analytics, of all involved components to create a holistic view of runtime characteristics of the event processing pipeline. The illustrative embodiments build a single view graphical user interface to visualize the runtime characteristics of the entire event processing pipeline and annotate it with observed issues in real-time. The illustrative embodiments execute predictive analytics on the aggregated runtime data to predict performance of the event processing pipeline and suggest remediation actions that may be performed to address predicted performance issues. The remediation actions suggested may be determined based on user specified resiliency configurations and may be implemented automatically to dynamically reconfigure the event flows of an event processing pipeline to alternative flows, perform offline batch processing of events, or even fail events where appropriate in order to increase performance of the event processing pipeline.

Figure 1B:
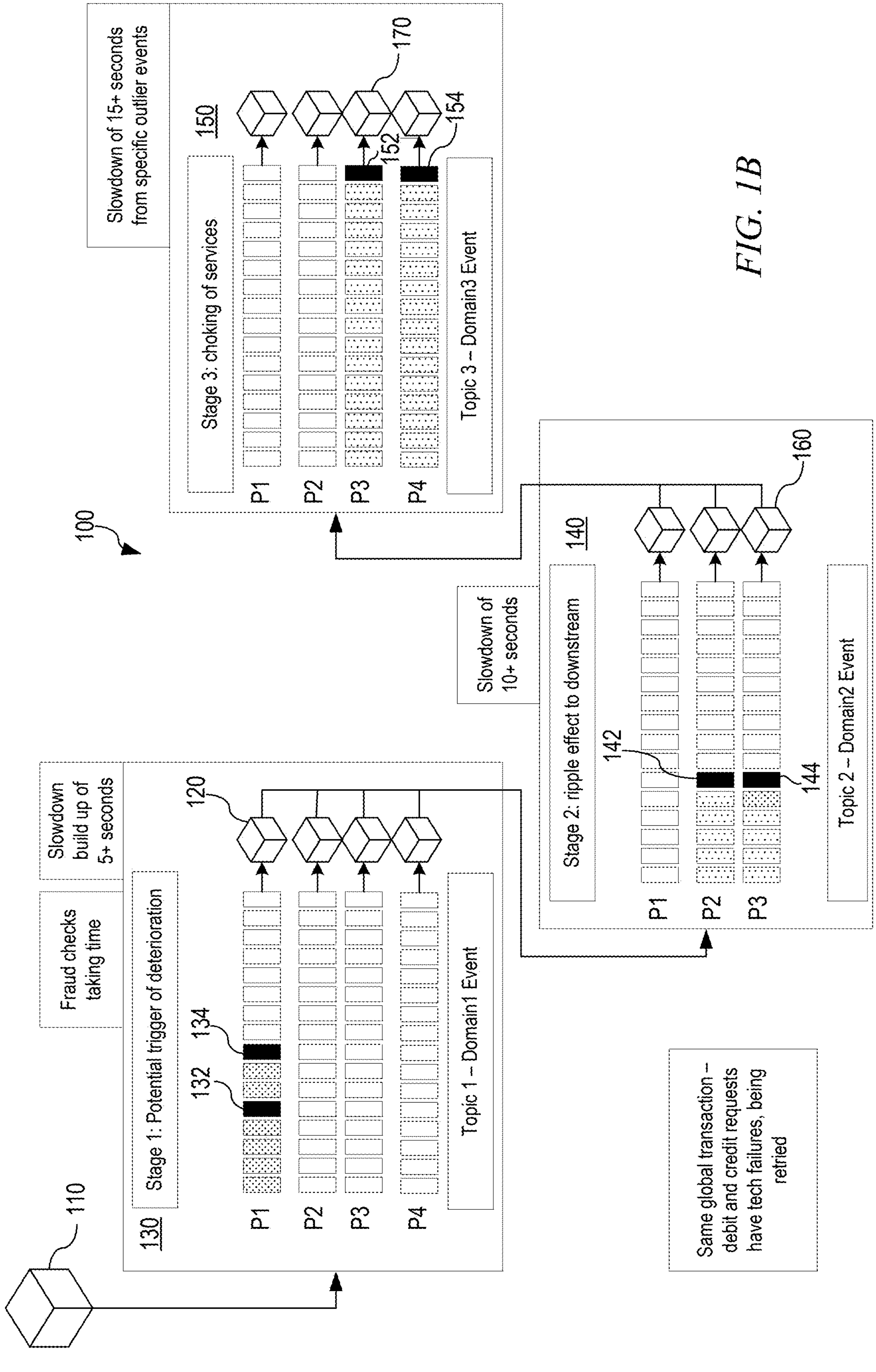
Figure 1C:
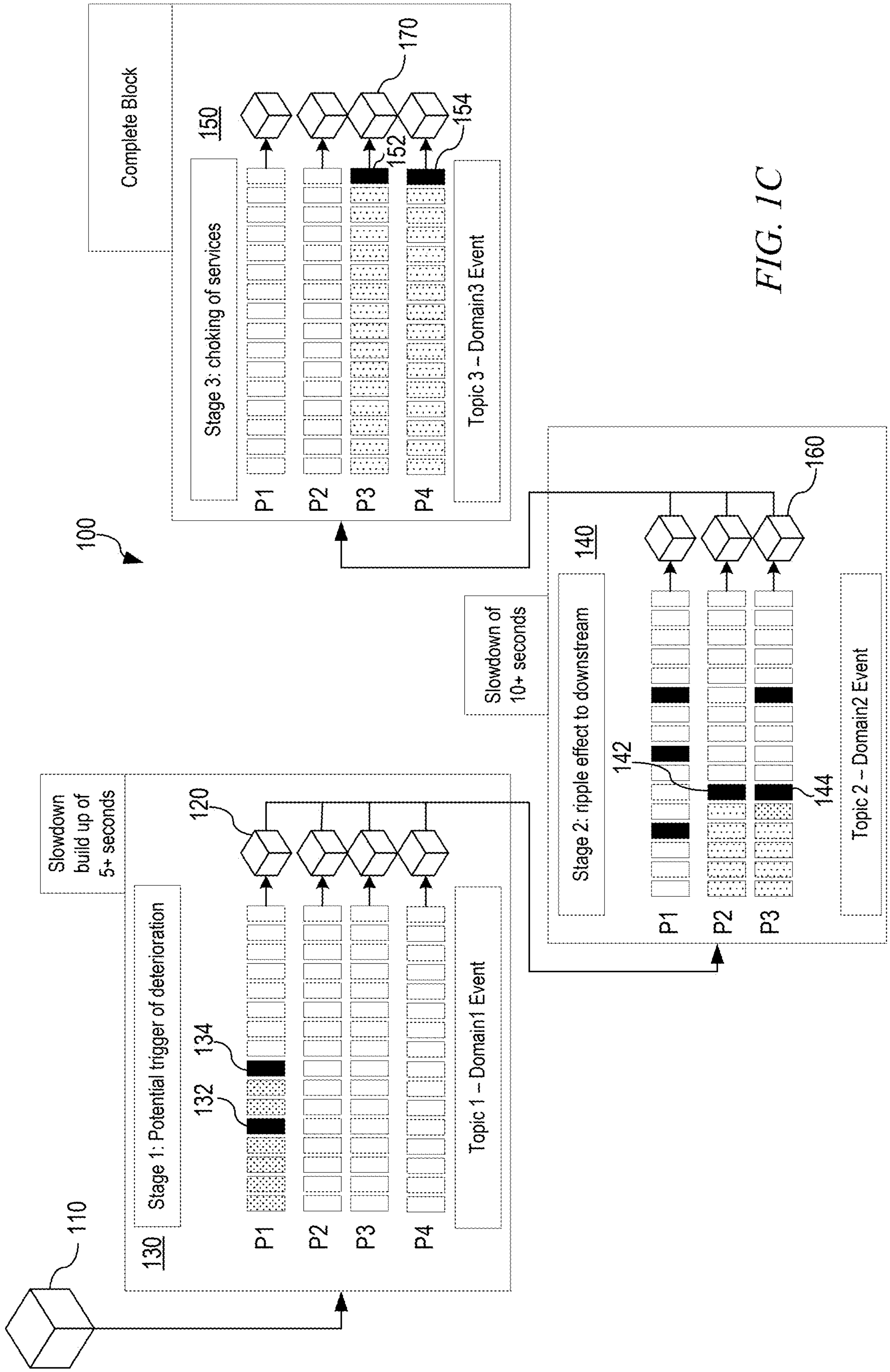

To further illustrate the performance issues of event processing pipelines addressed by the present invention, consider the example scenarios shown in FIGS. 1A-1C. FIGS. 1A-1C show an example event driven architecture (EDA) system 100 in which one or more event producers 110 provide events to one or more event consumers 120, 160, and 170 at multiple stages 130-150 of the processing by the EDA system 100. At each stage, the event consumers 120, 160, 170 of that stage may become event producers for the next stage in the EDA system 100. Each stage 130-150 may comprise one or more event processing pipelines, e.g., partitions P1-P4 are a first pipeline for stage 130, partitions P1-P3 are a pipeline for stage 140, and partitions P1-P4 are a pipeline for stage 150, which process events produced by that stage's event producers and which are consumed by the event consumers of that stage.

Thus, for example, the event consumers 120 of stage 130 may serve as event producers for the event consumers 160 of stage 140 and the event consumers 160 may serve as event producers for stage 150. At each stage, one or more services may be executed as part of partitions of event processing pipelines, e.g., partitions P1-P4, to perform work on the events produced by that stage's event producers. For example, one or more event processing pipelines in a first stage 130 of the event processing pipeline 100 may perform operations on events from the event producers 110 to determine if there are any fraudulent transactions, one or more event processing pipelines in a second stage 140 may operate on resulting events generated by the event consumers 120 to determine for those events that are not flagged as fraudulent, account access and available funds, and one or more event processing pipelines of a third stage 150 may operate on resulting events generated by the event consumers 160 to make vendor payments to vendors, e.g., event consumers 170.

These operations at each stage 130-150 may be considered "topics" and each "topic" may have a domain which has domain events. A topic, in integration architecture, is a logical entity that acts as a conduit for messages or events, allowing multiple producers to publish messages to it and multiple consumers to subscribe to it. When a message is published to a topic, it is received by all active subscribers to that topic. A domain is a specific area of concern or a segment of the overall organization logic that encompasses a set of related responsibilities, rules, data, and interactions. Domains help to structure a system in a way that reflects the organization's organizational structure and logic. A domain event is a record of a change or an occurrence of an action within a domain that has significance to an organization. It contains the details of what happened, when it happened, and the context in which it occurred. Domain events are typically published by the domain that owns the event and can be consumed by other domains or services that need to respond to or act upon that event.

Each stage 130-150 may be implemented on the same or different computing systems as other stages 130-150. Moreover, different computing devices may be associated with different ones of the event processing pipelines, or partitions P1-P4, P1-P3, etc., of event processing pipelines, of the corresponding stages 130-150.

The stages 130-150 may be one of three different types of EDA 100 stages, i.e., a source stage, a processor stage, or a sink stage. A source stage is a generator of an event. Processor stages may be of different types. Each processor stage will do its part of processing by consuming event information and forwarding/generating/enriching the event information for the next processor stage (via topic). Thus, processor stages take in an event, act on the vent, may also enrich/transform/generate new event information, and push that event information to another topic. A sink stage is a final stage of the event processing pipeline and consumes event information without forwarding to other downstream processors. In FIGS. 1A-1C, the left most "cube" element 110 is the source, or event generator, 110. It generates event information and puts it on "Topic 1". The four "cube" elements 120 (after that topic 120) are the processors which process the event information and either forward/transform/enrich the event information and pass it to Topic 2, which in turn is picked up by processor 160 and the event information is enriched/transformed/forward to Topic 3. The right most "cube" elements 170 consume those messages. The combination of Topic 1 and processors 120 is referred to as "Stage 1" 130. Similarly, the combination of Topic 2 and processors 160 is referred to as "Stage 2" 140. The combination of Topic 3 and processors 170 is referred to as "Stage 3" 150.

In a real-world example, the event generator 110 may generate a payment instruction which is pushed to Topic 1 of stage 130. The processors 120 validate the payment instruction and if it is valid, will push the payment instruction to Topic 2 of stage 140. The processors 160 of stage 140 will invoke the payment gateway to make the payment and push the outcome of that processing to Topic 3 of stage 150. The processors 170 of stage 150 may then record the outcome of the payment transaction.

Thus, each stage 130-150 of the EDA 100, and even individual event processing pipelines P1-P4 of each stage 130-150, may present possibilities for negative performance due to various sources of slowdown and failures in the processing of events. For example, slowdowns in the processing of particular events through event processing pipelines in one stage may completely block services from being able to be provided in later stages, may present significant performance impacts due to outlier events in later stages, or particular event providers may provide events that consistently cause slowdowns in some stages that result in failures or significant performance impacts in other stages. In each of these scenarios, and others, different remediation actions may be applied if these impacts can be predicted.

FIG. 1A is an example scenario in which there is a slowdown that builds up from one stage to the next resulting in a failure of certain services. For example, as shown in FIG. 1A, the fraud check operation in the first stage 130 is experiencing a slowdown which builds up, represented by processor events 132, 134 in event processing pipeline P1 of stage 130. The processing pipelines depict the internal organization of a topic. The messages in a topic are partitioned and are available in partitions P1 to P4 of the processing pipeline. This is done to increase the concurrency of processing. Each partition P1-P4 will have a log of messages which are depicted as a horizontally organized small color-coded rectangles in FIGS. 1A-1C. The number of partitions to have in a topic is a design time decision and may vary from one topic to another. Moreover, the number of partitions is not limited to any particular number, e.g., more or fewer partitions may be provided in each pipeline of each stage than those shown in FIGS. 1A-1C, and there may be more or fewer stages than that shown in FIGS. 1A-1C. Messages in a partition P1, P2, P3, or P4, are processed in a sequence. Rectangles of a partition, representing messages that are processed by that partition, that appear prior to a slowdown or failed message processing represented by reference numerals 132-134, 142-142, and 152-154 (e.g., to the left of those rectangles in the figure) mean that those messages are impacted by the subsequent slowdown/failure.

This slowdown in the first stage 130 may trigger deterioration in later stages 140-150. For example, as shown in stage 140, event processing pipelines P2 and P3 of stage 140 are affected by the slowdown in event processing pipeline P1 of stage 130. Thus, event processing pipeline P2 slows down by as much as 10 or more seconds as represented by 142, while event processing pipeline P3 experiences a failure as represented by 144. This continues into stage 150 where services are choked by the slowdown and failure in the previous stages 130-140 such that event processing pipelines P3 and P4 experience failures as a result. Thus, for example, a vendor may not be able to be compensated for a transaction if there is a complete block due to the slowdown in previous stages of the event processing pipeline.

In such a situation, it is important to be able to not only identify slowdowns in the event processing pipelines, but also predict their buildup and impact on the current and later stages of the EDA system 100, which again may encompass a variety of different services hosted and provided by a variety of different computing systems and devices. Moreover, it is important to be able to determine corrective or remediating actions prior to these slowdowns resulting in loss of services, such as shown in FIG. 1A. For example, in this case, as a remediating action, one could offload events that are associated with slowdowns, for offline processing or to an alternative service so as to prevent buildup of slowdowns and allow events to flow through the event processing pipelines more expeditiously and avoid or minimize failures. It would be beneficial to be able to predict such slowdowns and perform a corrective action to avoid the predicted slowdown.

FIG. 1B shows a second scenario of the EDA system 100 in which the slowdown buildup is due to specific outlier events. In such a case of specific outlier events causing the slowdown, and buildup of the slowdown, e.g., going from a 5 second slowdown in the first stage 130 to 15 seconds or more at the third stage 150, it can be beneficial to fail one set of transactions or events in order to avoid the significant slowdown, e.g., 10-15 or more seconds, on the remaining events, e.g., remaining thousands of events. In this second scenario, an alternative service may not be available, and thus, it may be beneficial to fail a set of transactions quickly so that they do not cause a delay to other message processing.

FIG. 1C shows a third scenario of the EDA system 100 in which the slowdowns may be due to specific types of events, e.g., all of a particular bank's transactions are facing issues during processing and thus, may cause slowdowns that build up over time within the event processing pipeline and may cause issues for other event producers. In such a case, it may be beneficial to redirect events of the particular type, e.g., events from the identified bank, to an alternative event processing flow, e.g., a side branch of the event processing pipeline, in the EDA system 100 which may allow other events to be processed through the primary event flow direction of the event processing pipeline.

Thus, different event processing slowdown scenarios and/or causes of these slowdowns may warrant different remediating actions. By identifying these slowdowns, their characteristics, e.g., types of events causing the slowdowns, sources of such events, and the like, and predicting their impact on the performance of the event processing pipeline, then the characteristics of the slowdown events and the predicted impact may be correlated with remediating actions, e.g., redirecting to an alternative event flow, failing a subset of events to open up the event flow, or offloading event processing to an offline process, which can be automatically implemented to address these slowdowns before the impact is realized and thereby increase the performance, e.g., throughput, of the event processing pipeline.

The illustrative embodiments provide an improved computing tool and improved computing tool operations/functionality that presents a framework to curate event metadata, identify and predict runtime event anomalies, dynamically determine remediating actions to perform, and dynamically and automatically execute the determined remediating actions so as to improve the performance of the event processing pipeline by minimizing the likelihood of service failures. The components of the framework of the illustrative embodiments collect information from runtime components regarding the runtime metrics, aggregated logs, and configuration of the runtime components of the event processing pipeline (collectively referred to herein as attributes of the event processing pipeline) and correlate these attributes to generate correlated runtime data. Predictive analytics and filtering may be executed on the correlated runtime data to identify and/or predict runtime event anomalies, e.g., impacts on performance of the event processing pipeline due to slowdowns of event processing. The predictive analytics and filter criteria identify outlier events that are causing slowdowns or potential failures of the event processing pipeline due to technical or functional failures. Based on these identifications and predictions of outlier events, dynamic reconfiguring of the events and/or event flows at an event granularity level is performed in accordance with a configuration of the remediating actions for reconfiguring the events/event flows. This configuration may be specified as event processing pipeline resiliency behaviors that may be mapped to specific use cases represented by attributes of the event processing pipeline and predicted runtime event anomalies.

Based on this operation, the illustrative embodiments are able to provide a real-time event driven architecture (EDA) command center holistic view of one or more event processing pipelines and their individual stages with regard to predicted anomalies. Elements of this holistic view, corresponding to components of the one or more event processing pipelines, may be rendered with attributes that distinguish elements from one another based on their corresponding predicted anomalies (associated with the components of the pipeline to which the elements correspond) and their severity, or lack thereof, e.g., color coded or otherwise graphically or textually described in a distinguishing manner from other elements of the holistic view. Moreover, elements of the holistic view may be annotated with regard to causal information and may present suggested remediating actions that may be performed to address the predicted anomalies. Moreover, in some cases, these suggested remediating actions may be automatically implemented so as to avoid or minimize the impact of the predicted anomalies.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

The present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides an event resiliency framework comprising a plurality of components that operate to monitor, in real-time, one or more event processing pipelines of an event driven architecture (EDA), identify and predict anomalies within the event processing pipeline(s), determine one or more resiliency remediation actions to recommend/implement to minimize negative impacts of such identified/predicted anomalies, and present a holistic view of the EDA and its event processing pipelines. The improved computing tool implements mechanism and functionality, such as the event resiliency framework comprising an event resiliency metadata curator, predictive analytics engine(s), fault circuit interrupt machine (FCIM), and event resiliency configuration engine, which cannot be practically performed by human beings either outside of, or with the assistance of, a technical environment, such as a mental process or the like. The improved computing tool provides a practical application of the methodology at least in that the improved computing tool is able to perform real-time monitoring of event processing pipelines and predict impacts of any anomalies identified/predicted to occur in the event processing pipelines as well as generate recommended remediation actions and present a holistic view of the EDA.

Figure 2:
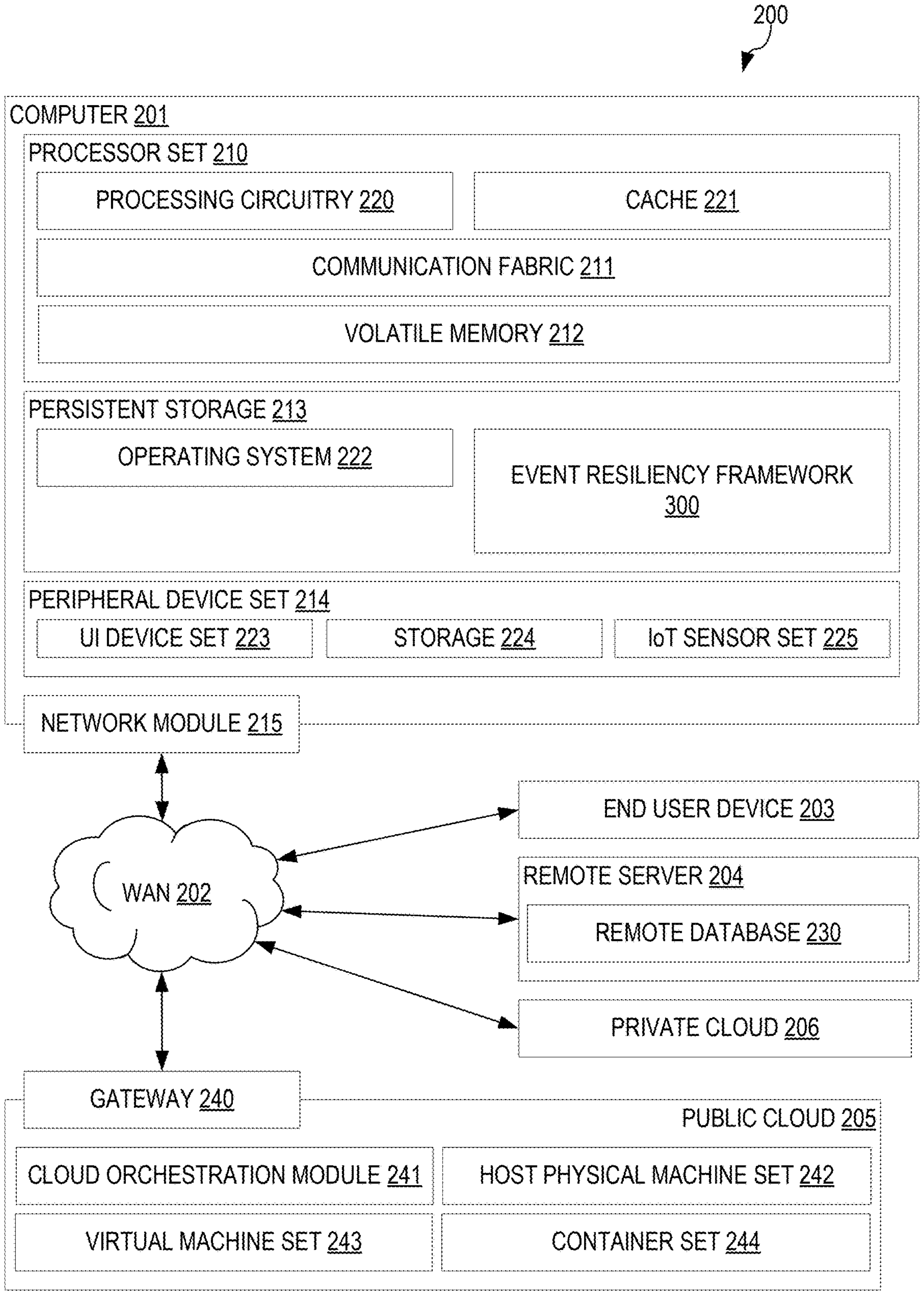
FIG. 2 is an example diagram of a distributed data processing system environment in which aspects of the illustrative embodiments may be implemented and at least some of the computer code involved in performing the inventive methods may be executed.

FIG. 2 is an example diagram of a distributed data processing system environment in which aspects of the illustrative embodiments may be implemented and at least some of the computer code involved in performing the inventive methods may be executed. That is, computing environment 200 contains an example of an environment for the execution of at least some of the computer code involved in performing the inventive methods, such as event resiliency framework 300. In addition to event resiliency framework 300, computing environment 200 includes, for example, computer 201, wide area network (WAN) 202, end user device (EUD) 203, remote server 204, public cloud 205, and private cloud 206. In this embodiment, computer 201 includes processor set 210 (including processing circuitry 220 and cache 221), communication fabric 211, volatile memory 212, persistent storage 213 (including operating system 222 and event resiliency framework 300, as identified above), peripheral device set 214 (including user interface (UI), device set 223, storage 224, and Internet of Things (IoT) sensor set 225), and network module 215. Remote server 204 includes remote database 230. Public cloud 205 includes gateway 240, cloud orchestration module 241, host physical machine set 242, virtual machine set 243, and container set 244.

Computer 201 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 230. As is well understood in the art of computer technology, and depending upon the technology, performance of a computer-implemented method may be distributed among multiple computers and/or between multiple locations. On the other hand, in this presentation of computing environment 200, detailed discussion is focused on a single computer, specifically computer 201, to keep the presentation as simple as possible. Computer 201 may be located in a cloud, even though it is not shown in a cloud in FIG. 2. On the other hand, computer 201 is not required to be in a cloud except to any extent as may be affirmatively indicated.

Processor set 210 includes one, or more, computer processors of any type now known or to be developed in the future. Processing circuitry 220 may be distributed over multiple packages, for example, multiple, coordinated integrated circuit chips. Processing circuitry 220 may implement multiple processor threads and/or multiple processor cores. Cache 221 is memory that is located in the processor chip package(s) and is typically used for data or code that should be available for rapid access by the threads or cores running on processor set 210. Cache memories are typically organized into multiple levels depending upon relative proximity to the processing circuitry. Alternatively, some, or all, of the cache for the processor set may be located "off chip." In some computing environments, processor set 210 may be designed for working with qubits and performing quantum computing.

Computer readable program instructions are typically loaded onto computer 201 to cause a series of operational steps to be performed by processor set 210 of computer 201 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 221 and the other storage media discussed below. The program instructions, and associated data, are accessed by processor set 210 to control and direct performance of the inventive methods. In computing environment 200, at least some of the instructions for performing the inventive methods may be stored in event resiliency framework 300 in persistent storage 213.

Communication fabric 211 is the signal conduction paths that allow the various components of computer 201 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 212 is any type of volatile memory now known or to be developed in the future. Examples include dynamic type random access memory (RAM) or static type RAM. Typically, the volatile memory is characterized by random access, but this is not required unless affirmatively indicated. In computer 201, the volatile memory 212 is located in a single package and is internal to computer 201, but, alternatively or additionally, the volatile memory may be distributed over multiple packages and/or located externally with respect to computer 201.

Persistent storage 213 is any form of non-volatile storage for computers that is now known or to be developed in the future. The non-volatility of this storage means that the stored data is maintained regardless of whether power is being supplied to computer 201 and/or directly to persistent storage 213. Persistent storage 213 may be a read only memory (ROM), but typically at least a portion of the persistent storage allows writing of data, deletion of data and re-writing of data. Some familiar forms of persistent storage include magnetic disks and solid state storage devices. Operating system 222 may take several forms, such as various known proprietary operating systems or open source Portable Operating System Interface type operating systems that employ a kernel. The code included in event resiliency framework 300 typically includes at least some of the computer code involved in performing the inventive methods.

Peripheral device set 214 includes the set of peripheral devices of computer 201. Data communication connections between the peripheral devices and the other components of computer 201 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 223 may include components such as a display screen, speaker, microphone, wearable devices (such as goggles and smart watches), keyboard, mouse, printer, touchpad, game controllers, and haptic devices. Storage 224 is external storage, such as an external hard drive, or insertable storage, such as an SD card. Storage 224 may be persistent and/or volatile. In some embodiments, storage 224 may take the form of a quantum computing storage device for storing data in the form of qubits. In embodiments where computer 201 is required to have a large amount of storage (for example, where computer 201 locally stores and manages a large database) then this storage may be provided by peripheral storage devices designed for storing very large amounts of data, such as a storage area network (SAN) that is shared by multiple, geographically distributed computers. IoT sensor set 225 is made up of sensors that can be used in Internet of Things applications. For example, one sensor may be a thermometer and another sensor may be a motion detector.

Network module 215 is the collection of computer software, hardware, and firmware that allows computer 201 to communicate with other computers through WAN 202. Network module 215 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 215 are performed on the same physical hardware device. In other embodiments (for example, embodiments that utilize software-defined networking (SDN)), the control functions and the forwarding functions of network module 215 are performed on physically separate devices, such that the control functions manage several different network hardware devices. Computer readable program instructions for performing the inventive methods can typically be downloaded to computer 201 from an external computer or external storage device through a network adapter card or network interface included in network module 215.

WAN 202 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 203 is any computer system that is used and controlled by an end user (for example, a customer of an enterprise that operates computer 201), and may take any of the forms discussed above in connection with computer 201. EUD 203 typically receives helpful and useful data from the operations of computer 201. For example, in a hypothetical case where computer 201 is designed to provide a recommendation to an end user, this recommendation would typically be communicated from network module 215 of computer 201 through WAN 202 to EUD 203. In this way, EUD 203 can display, or otherwise present, the recommendation to an end user. In some embodiments, EUD 203 may be a client device, such as thin client, heavy client, mainframe computer, desktop computer and so on.

Remote server 204 is any computer system that serves at least some data and/or functionality to computer 201. Remote server 204 may be controlled and used by the same entity that operates computer 201. Remote server 204 represents the machine(s) that collect and store helpful and useful data for use by other computers, such as computer 201. For example, in a hypothetical case where computer 201 is designed and programmed to provide a recommendation based on historical data, then this historical data may be provided to computer 201 from remote database 230 of remote server 204.

Public cloud 205 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 205 is performed by the computer hardware and/or software of cloud orchestration module 241. The computing resources provided by public cloud 205 are typically implemented by virtual computing environments that run on various computers making up the computers of host physical machine set 242, which is the universe of physical computers in and/or available to public cloud 205. The virtual computing environments (VCEs) typically take the form of virtual machines from virtual machine set 243 and/or containers from container set 244. It is understood that these VCEs may be stored as images and may be transferred among and between the various physical machine hosts, either as images or after instantiation of the VCE. Cloud orchestration module 241 manages the transfer and storage of images, deploys new instantiations of VCEs and manages active instantiations of VCE deployments. Gateway 240 is the collection of computer software, hardware, and firmware that allows public cloud 205 to communicate through WAN 202.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 206 is similar to public cloud 205, except that the computing resources are only available for use by a single enterprise. While private cloud 206 is depicted as being in communication with WAN 202, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 205 and private cloud 206 are both part of a larger hybrid cloud.

As shown in FIG. 2, one or more of the computing devices, e.g., computer 201 or remote server 204, may be specifically configured to implement an event resiliency framework 300. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as computer 201 or remote server 204, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates real-time event processing pipeline monitoring, predictive analytics, dynamic adaptation of the event processing pipelines to reduce the impact of anomalies on event processing, and presentation of a real-time holistic view of the event driven architecture (EDA).

Figure 3:
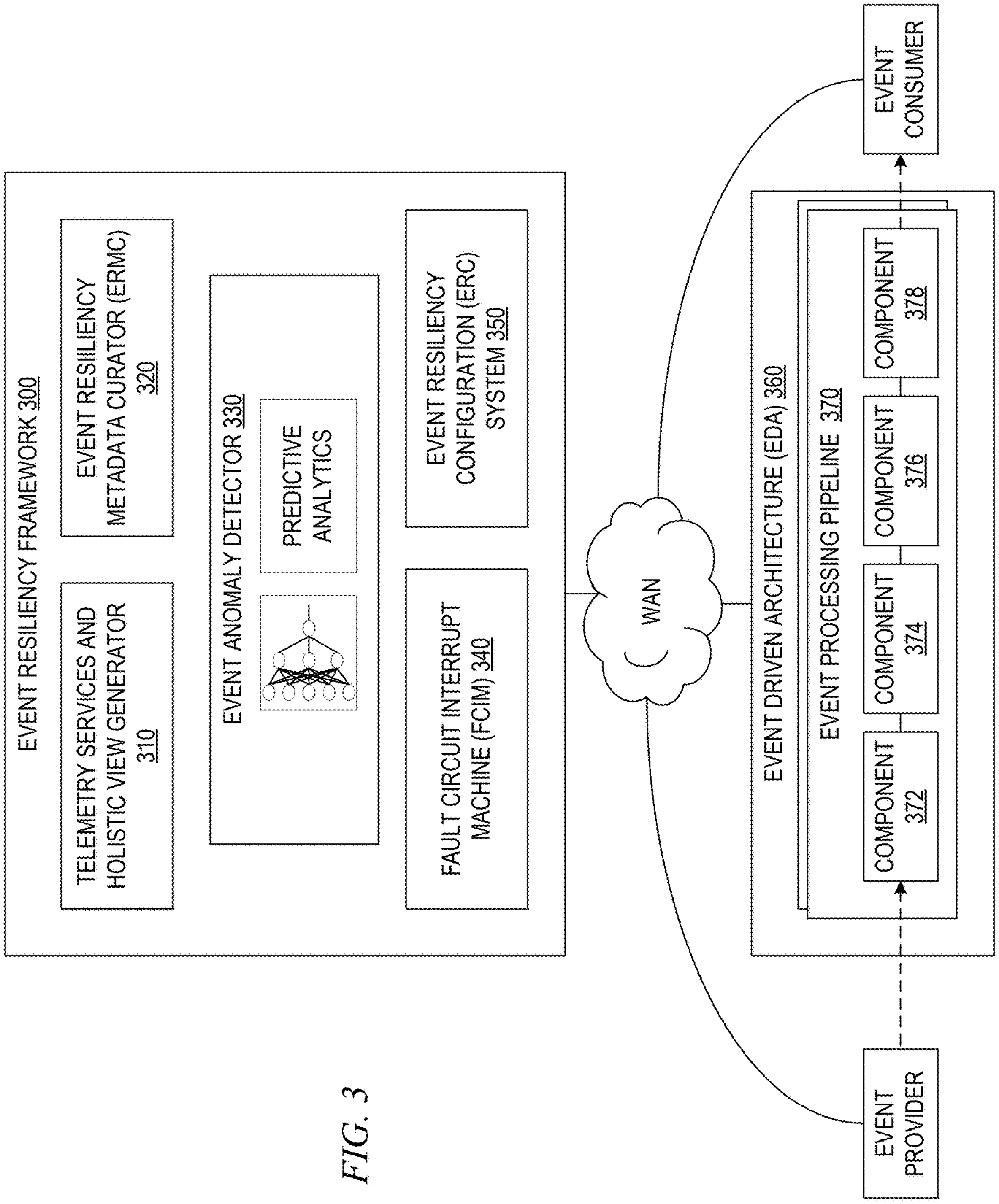
FIG. 3 is an example block diagram of the primary operational components of an event processing pipeline real-time observability and enhanced resiliency system in accordance with one illustrative embodiment.

FIG. 3 is an example block diagram of the primary operational components of an event resiliency framework in accordance with one illustrative embodiment. The operational components shown in FIG. 3 may be implemented as dedicated computer hardware components, computer software executing on computer hardware which is then configured to perform the specific computer operations attributed to that component, or any combination of dedicated computer hardware and computer software configured computer hardware. It should be appreciated that these operational components perform the attributed operations automatically, without human intervention, even though inputs may be provided by human beings, e.g., recommended resiliency remediation actions for specified event and event processing pipeline contexts and anomalies, and the resulting output may aid human beings, e.g., an event driven architecture (EDA) command center holistic view graphical user interface or the like. The invention is specifically directed to the automatically operating computer components directed to improving the way that event processing through one or more event processing pipelines is conducted, and specifically with regard to real-time predicting of anomalous events and real-time determinations of resiliency remediation actions to implement to minimize predicted negative impacts on event processing pipeline performance, which cannot be practically performed by human beings as a mental process and is not directed to organizing any human activity.

As shown in FIG. 3, the event resiliency framework 300 comprises telemetry services and holistic view generator 310, Event Resiliency Metadata Curator (ERMC) 320, an Event Anomaly Detector (EAD) 330, a Fault Circuit Interrupt Machine (FCIM) 340, and an Event Resiliency Configuration (ERC) system 350. For clarification, the term "circuit interrupt" with regard to the FCIM 340 refers to the fact that every message processing journey is carried out like a circuit or sequence, such as service 1 first, then service 2, and then service 3. During a fault at service 2, for example, the original circuit can be interrupted by the FCIM 340 to create an alternate circuit, such as service 1 first, then service 4, and then service 3, for example, or take other corrective actions, as discussed hereafter. Thus, the FCIM 340 is a fault circuit interrupt mechanism.

The event resiliency framework 300 operates in conjunction with an event driven architecture (EDA) 360 comprising one or more event processing pipelines 370 having a plurality of runtime components 372-378. These runtime components 372-378 may comprise software and/or hardware computing resources, data structures, storage devices, and the like, i.e., any computing resources needed to perform event processing in an EDA. The components are instrumented to emit runtime metrics, such as via using Application Performance Monitoring (APM) tools, generate aggregated logs of events and corresponding transformations to generate additional insights and details of event processing, and trace and record events flowing through the event processing pipelines of the various stages of the EDA 360. The illustrative embodiments take the inputs from APM tools, log aggregators, event tracing, and the like, and convert these inputs into intelligence to identify metadata of messages which drive changes to configurations or service flows to achieve high performance and fault tolerance.

The telemetry services and holistic view generator 310 of the event resiliency framework 300 receives the runtime metrics, aggregated logs, event tracings and recordings, and the like, from the EDA 360 and its components 372-378 of the event processing pipeline(s) 370 and aggregates the metrics emitted by the components using a variety of tools, such as Dynatrace or the like, to create consolidated snapshots of runtime characteristics of each component 372-378 of each monitored event processing pipeline 370 of the EDA 360. The telemetry services and holistic view generator 320 identifies relationships between the components 372-378, such as through configuration information corresponding to the components 372-378, the event processing pipeline(s) 370, and/or the EDA 360, through real-time interception of method invocations, or the like. For example, in some illustrative embodiments, every event has a global event identifier, also referred to as a correlation id, which is included in all related events that service a request. By looking at the global event identifier (or correlation id), and timestamps, relationships between components can be determined, e.g., components that process events associated with the same global event identifier, within a given timeframe of each other, may be related to one another and the later timestamp means that the component is after a previous component servicing the event with an earlier timestamp. Other types of analysis for determining relationships between components may likewise be used without departing from the spirit and scope of the present invention.

Figure 4:
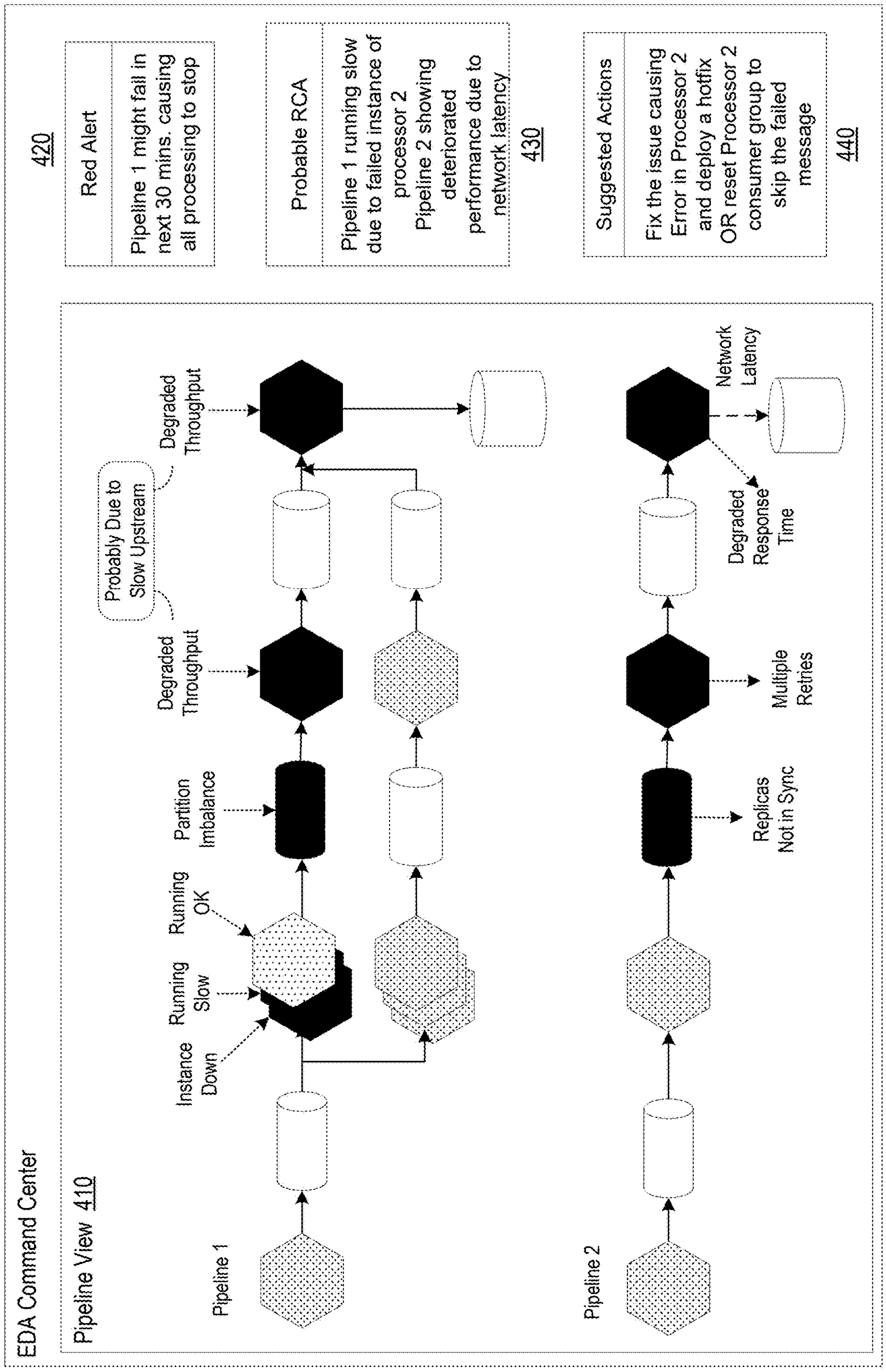
FIG. 4 is an example diagram illustrating a holistic view of an EDA command center in accordance with one illustrative embodiment.

The telemetry services and holistic view generator 310 combines the runtime characteristics of all the involved components to create a holistic view of the runtime characteristics of the event processing pipeline(s) 370. This holistic view may drive the presentation of a graphical user interface to visualize the runtime characteristics of the entire event processing pipeline with annotations showing observed issues in real-time, such as threshold breaches, errors, deviations from baseline performance, and the like, where such baselines may be established through automated analysis over a given period of time and given normal event processing workloads. Thus, the graphical user interface presents a visualization that associates runtime metrics, aggregated logs, traces and configuration to create a holistic snapshot of components 372-378 of the event processing pipeline(s) 370, and correlates component snapshots to create a snapshot of the end-to-end event processing pipeline(s) 370. An example of a holistic view and graphical user interface visualization is shown in FIG. 4, which will be described in greater detail hereafter.

The telemetry services and holistic view generator 310 may operate in conjunction with the ERMC 320 to collect the metrics, log, configuration information, and the like, sand generate event metadata based on correlations of event information with the collected metrics, logs, and the like. Thus, while the telemetry services and holistic view generator 310 is collecting and processing the metrics, logs, etc., in real-time and generating real-time holistic views of the EDA 360 and its event processing pipelines 370, the real-time metrics, logs, and the like may also be processed via the event resiliency framework 300 with the results of such processing being used to dynamically update the holistic view, such as via annotations or other textual/graphical modifications to the holistic view.

The ERMC 320 comprises computer executed logic, hardware, and resources that operate on collected event information from the event processing pipeline 370 and to identify attributes of events that are causing slowdowns or failures by corelating the telemetry data collected by the telemetry services and holistic view generator 310 with changes in attributes, while also simulating testing in test environments to enrich this data. That is, the ERMC 320 ingests the telemetry data for all event outliers based on performance or success rate key performance indicators (KPIs), ingests logs from all services involved in the event processing, and fills in any gaps of missing data by simulating events in a test environment. The ERMC 320 creates a universe of metadata based on this initial analysis by identifying, for each set of outlier events, possible metadata attributes. The ERMC 320 further performs correlation and executes an associativity scoring model to rank and order the attributes with high propensity to cause failures. The ERMC 320 further generates a finalized list of metadata by performing simulations, e.g., executing test requests in a test environment, to filter out attributes that have a propensity, or ranking, that is below a threshold propensity, or threshold ranking, to cause event outliers, e.g., cause slowdowns or failures.

The resulting attributes generated by the ERMC 320 of the involved components 372-378 of the monitored event processing pipelines(s) 370 may be used as input features to the event anomaly detector 330 which may implement one or more machine learning computer models, predictive analytics, or the like, to identify and predict potential performance anomalies for the event processing pipeline(s) 370 and/or other downstream stages of the EDA 360, e.g., if there are other downstream event processing pipelines which are fed by the event processing pipeline 370. These predictive models and analytics may include various types of predictive analysis including predictions as to slowdown buildup in the event processing pipeline(s) 370, failures of components 372-378 in the event processing pipeline(s) 370, root cause analysis, and the like. The predictive models and analytics use observability health metrics for each of the components, such as response time of the component, its throughput, its resource usage, errors generated, as well as responses to periodic health checks, in addition to the ranked listing of metadata attributes, to determine and predict slowdowns and failures of components.

The prediction models and analytics identify anomalies in the performance of the components 372-378 of the event processing pipeline and predict how those anomalies will impact performance, such as at subsequent stages of the event processing pipeline(s) 370. Based on the predicted anomalies, the Fault Circuit Interrupt Machine (FCIM) 340 operates to provide recommendations, and/or dynamic implement, reconfiguring of event flows at an event and component granular level such that the FCIM 340 recommends/takes resilience remediation actions to improve the overall event ecosystem resiliency of the EDA 360 without compromising the transaction integrity of the ecosystem.

For example, the FCIM 340, based the characteristics of the predicted anomaly, and component real-time state as determined from the telemetry data, and user specified resiliency configurations provided via the event resiliency configuration system 350 described hereafter, can selectively move event messages (or simply "events") to functionally compliant alternative event processing pipelines based on a type of identified event metadata, e.g., only events of specific types based on enriched metadata from the operation of the event resiliency metadata curator are moved from a main event flow of the event processing pipeline In some cases, the FCIM 340, based on analysis of such metadata, component states, and resiliency configurations, selectively fail specific event processing based on specific identified event metadata of events causing slowdown or failures in the event processing pipeline(s) 370. In some cases, the FCIM 340, based on analysis of such metadata, component states, and resiliency configurations, selectively offload events for offline batch processing (lower QoS) based on a specific identified event metadata of events causing slowdown or failures in the event processing pipeline(s) 370, keeping overall services at higher QoS. The illustrative embodiments may take any additional resiliency actions based on user defined resiliency behaviour as per the event resiliency configuration (ERC) system 350 without departing from the spirit and scope of the present invention.

The Event Resiliency Configuration (ERC) system 350 provides a framework through which users are able to specify and configure resiliency behaviors as per their requirements and use cases for specific types of slowdowns or failures of components of event processing pipelines. These behaviors may be specified at the granular level of event types based on identified event resiliency metadata. For example, the configurations of behaviors may specify particular event resiliency remediation actions to take, e.g., alternate event processing pipeline paths, batch offload of events, fast-fail unhealth event types to free event processing pipelines or the like. Such configurations may be specific for users and stored in lookup tables such that these configurations of behaviors may be retrieved by the FCIM 340 and applied to predicted states of the event processing pipeline 370.

As mentioned above, the event resiliency framework 300 generates a holistic view of the EDA and event processing pipeline(s) 370 based on the real-time telemetry data. Moreover, this holistic view may be presented in a graphical user interface and may be updated, annotated, or otherwise modified to represent the identified/predicted anomalies generated by the event anomaly detector 330, along with the recommended resiliency remediation actions determined by the FCIM 340 for the identified/predicted anomalies in accordance with any user specified event resiliency configurations specified via ERC system 350. These real-time holistic views may be provided via an EDA command center, for example, to one or more authorized personnel. In some embodiments, the EDA command center may further orchestrate automated implementation of some of these recommended resiliency remediation actions in the event processing pipeline 370.

FIG. 4 is an example diagram illustrating a holistic view of an EDA command center in accordance with one illustrative embodiment. As shown in FIG. 4, a first portion 410 of the holistic view comprises graphical representations of the event processing pipelines of the EDA with various components of the pipelines represented by corresponding graphical elements. Characteristics of the graphical elements, e.g., colors, sizes, highlighting, or any other characteristics, may be used to represent the identified and/or predicted states of these components, and may have annotations specifying the meaning of the graphical representations, e.g., running slow, instance down, imbalanced, degraded throughput, multiple retries, degraded response time, network latency, etc. In some cases, based on root cause analysis performed by the analytics, annotations may be provided to specify probable root causes of the performance impacts identified in the event processing pipelines, e.g., probably due to slow upstream. Thus, a user may quickly identify from this holistic view where problems may be present in the event processing pipeline in real-time and may identify probable causes.

In addition, portions 420 and 430 of the holistic view may specify significant predicted anomalies and probable root cause analysis results for the event processing pipelines based on the operations of the event resiliency framework of the illustrative embodiments. For example, it may be determined that a predicted anomaly of pipeline 1 in this example is that it may fail in the next 30 minutes causing all processing to stop. Moreover, it may be determined that pipeline 1 is running slow due to a failed instance of processor 2 and that pipeline 2 is showing deteriorated performance due to network latency. In addition, a portion 440 may be provided for output the FCIM generated recommendations, i.e., suggested actions. In the depicted example, the suggested action is to fix the issue causing the error in processor 2 and deploy a hotfix OR reset processor 2 consumer group to skip the failed message.

Figure 5:
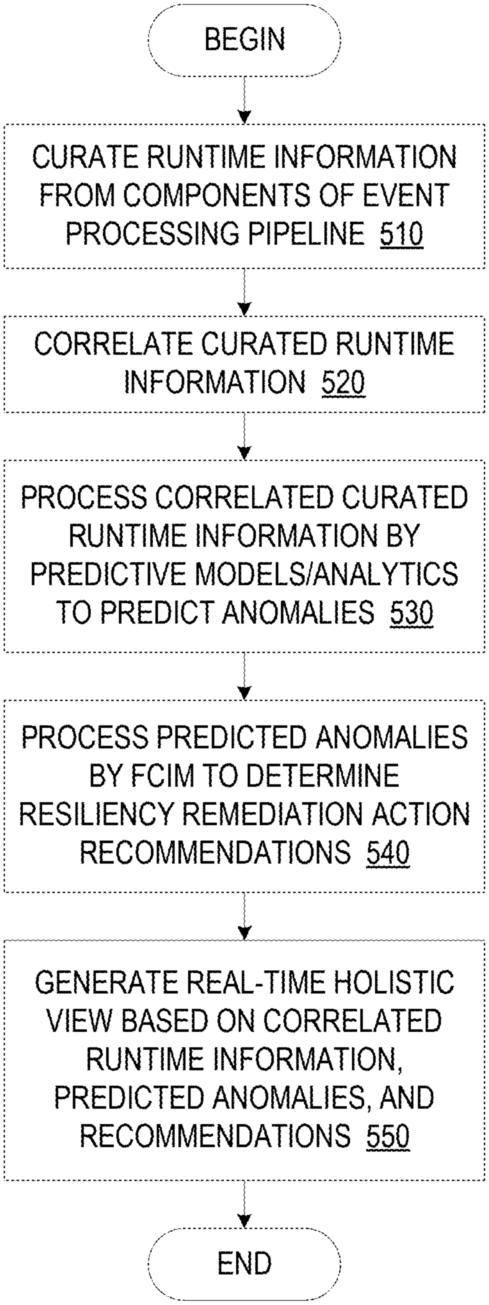
FIG. 5 is a flowchart outlining an example operation of an event processing pipeline real-time observability and enhanced resiliency system in accordance with one illustrative embodiment.

FIGS. 5-7 present flowcharts outlining example operations of elements of the present invention with regard to one or more illustrative embodiments. It should be appreciated that the operations outlined in FIGS. 5-7 are specifically performed automatically by an improved computer tool of the illustrative embodiments and are not intended to be, and cannot practically be, performed by human beings either as mental processes or by organizing human activity. To the contrary, while human beings may, in some cases, initiate the performance of the operations set forth in FIGS. 5-7, and may, in some cases, make use of the results generated as a consequence of the operations set forth in FIGS. 5-7, the operations in FIGS. 5-7 themselves are specifically performed by the improved computing tool in an automated manner.

FIG. 5 is a flowchart outlining an example operation of an event resiliency framework in accordance with one illustrative embodiment. As shown in FIG. 5, the operation starts by performing curation of runtime information from components of an event processing pipeline, wherein the runtime information comprises real-time runtime metrics, aggregated logs, event tracing/recording data structures, and configuration information (step 510). This curated runtime information is correlated to generate correlated runtime data (step 520). The correlated runtime data is processed by predictive models and analytics to identify and/or predict anomalies in the components of the event processing pipeline (step 530). The identified/predicted anomalies are processed by the FCIM based on user resiliency configurations to determine event resiliency remediation actions to recommend for addressing the identified/predicted anomalies (step 540). The correlated runtime data is used to generate a real-time holistic view of the components of the event processing pipeline which is updated with annotations and recommendations for addressing the identified/predicted anomalies (step 550). The operation then terminates. While FIG. 5 shows the process terminating, it should be appreciated that the operation may continue on a continuous or periodic basis so as to keep the holistic view up to date with the real-time state of the event processing pipeline.

Figure 6A:
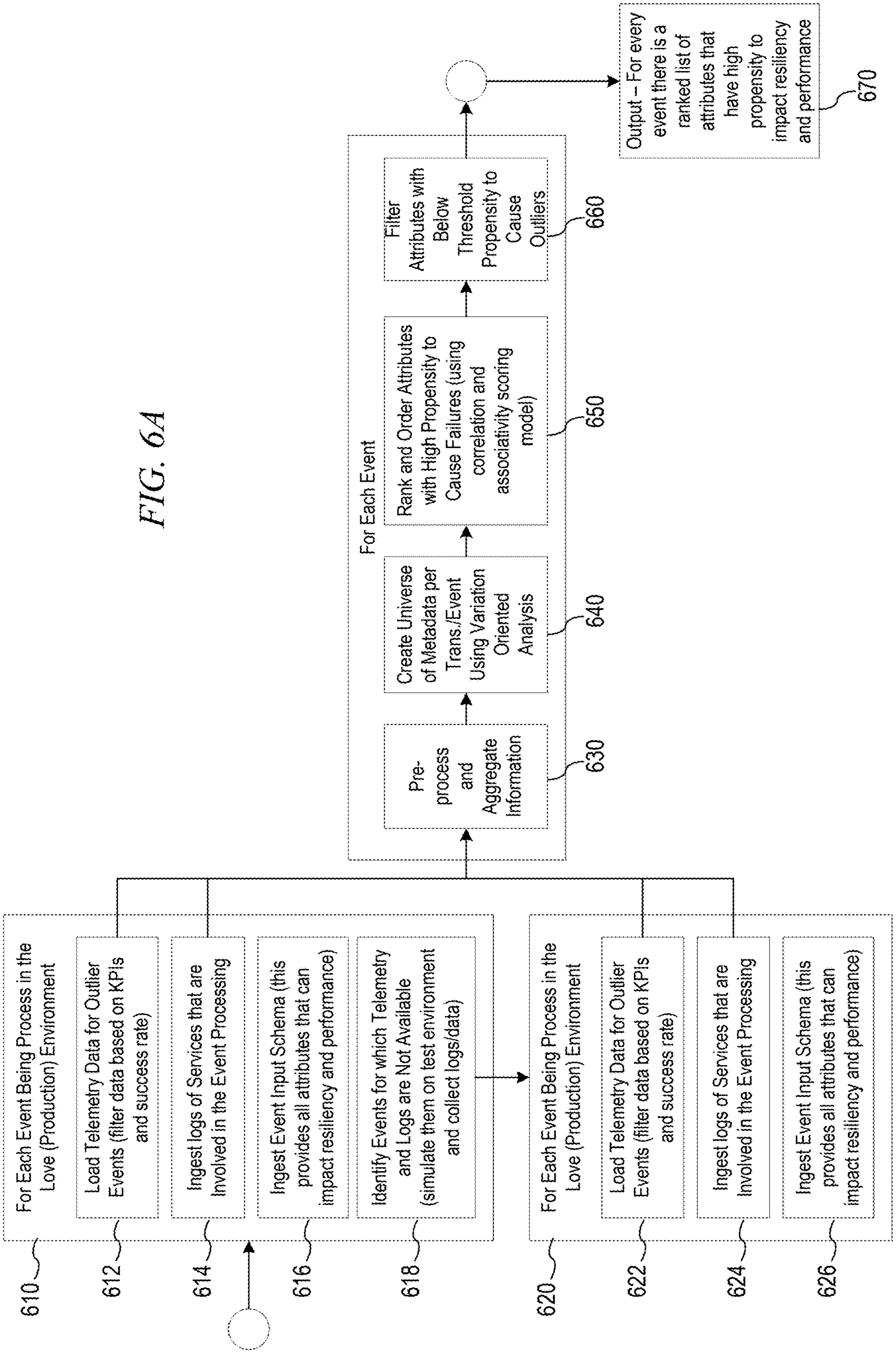
FIG. 6A is a flowchart outlining an example operation of an event resiliency metadata curator in accordance with one illustrative embodiment.

FIG. 6A is a flowchart outlining an example operation of an event resiliency metadata curator (ERMC) in accordance with one illustrative embodiment. As shown in FIG. 6A, the operation starts with a set of operations 610 being performed on each event being processed in the live (production) environment. In a first operation, telemetry data for all outlier events is loaded, where these outlier events are identified by filtering the data based on key performance indicators (KPIs) and success rate, e.g., comparing attribute values, or KPIs, of a failure instance with those of a success instance at approximately a same given time (step 612). For example, between a failure instance and a success instance, if for example 95 attribute values of a total of 100 attribute values are not different from those of a success instance, and only 5 attribute values are different, then these 5 attributes have a propensity of causing failures. Moreover, if 50%, or other desired threshold setting for the particular implementation, of the failures at approximately a same given time happen due to a change in an attribute value (or KPI value) of a specific attribute, e.g., Beneficiary Bank Reference, such that any request having a value "bank1" is failing and any request having a value of "bank2" is not failing, this attribute is making a difference between success and failure and thus, may be considered a KPI for filtering data. Other types of such determinations of KPIs may be, for example, a predetermined number of errors happening on a particular day and time, e.g., August 1st between 6 pm and 6:15 pm, for all requests having specific values of a "Beneficiary Bank Reference" attribute, and other specific values of this same attribute being associated with successful requests during this same timeframe.

The logs of services that are involved in the event processing are ingested (step 614) and the event input schema is ingested (step 616), where this event input schema provides all the attributes that can possibly impact resiliency and performance. The operation then identifies events for which telemetry and logs are not available, i.e., failure events in which the relevant logs and any additional telemetry data is not available to conclude what attribute values may have caused the failure. Only those events for which there is not enough, or no, logs or telemetry data available to filter out specific attribute values causing the error, are simulated.

For these events, the events are simulated in a test environment and the logs and telemetry data for the simulations are collected (step 618), as represented in the set of operations 620. Thus, the operations in the set of operations 620 are similar to those of the production environment other than the data being collected is coming from simulations of the failed events for which there are no, or not enough, logs or telemetry data.

As shown in the set of operations 620, for each event being simulated in the test environment, the telemetry data for all outlier events, e.g., events which are failing or taking a longer time than expected, is loaded (step 622). The logs of services that are involved in the event processing are ingested (step 624) and the event input schema is ingested (step 626). For example, an event, e.g., "international payment failed", may be identified for which there are no logs available. The test environment may be used to initiate multiple requests changing 1 attribute at a time and keeping the other attributes constant, until one gets the same event as obtained during the execution in the production (live) environment. Once a matching event is obtained, the logs and telemetry data generated in the test environment for the matching event may be used as the simulation logs/telemetry data for the event that failed in the production environment.

Thus, telemetry data, logs, and event input schemas are collected and ingested for both events processed in the live environment and events that need to be simulated in a test environment. This data is then pre-processed and aggregated (step 630). The preprocessing may involve mapping each error (or failed) event to an input request with the attribute values of the error event and request being correlated. The aggregation may comprise aggregating the error (or failed) events occurring within the substantially the same predetermined time period and/or instances of the same error (or failed) events within a given predetermined time period. The pre-processed and aggregated runtime information is then used to create a universe of metadata per transaction/event using variation oriented analysis (step 640). The universe is every attribute in the input request and corresponding events. The variation oriented analysis is an analysis to identify what is varying between a success request and a failure request at substantially a same given window of time, e.g., comparing many success events and many failure events so as to identify the attributes whose values differ between success events and failure events, e.g., Beneficiary Bank Reference or the like.

Based on the universe of metadata per transaction/event, metadata attributes are ranked and ordered according to the propensity to cause anomalies, e.g., slowdowns or failures, such as by using correlation and executing an associativity scoring model that scores the metadata attributes with regard to their propensity to cause anomalies (step 650). Based on the ranking of metadata attributes, and a predetermined threshold propensity or score, attributes are filtered out that do not have a threshold propensity or score to cause anomalies (step 660). The result is a ranked listing, for each type of event, of metadata attributes that have a high propensity to impact resiliency and performance of the event processing pipeline which may be output for use in predicting anomalies (step 670).

Figure 6B:
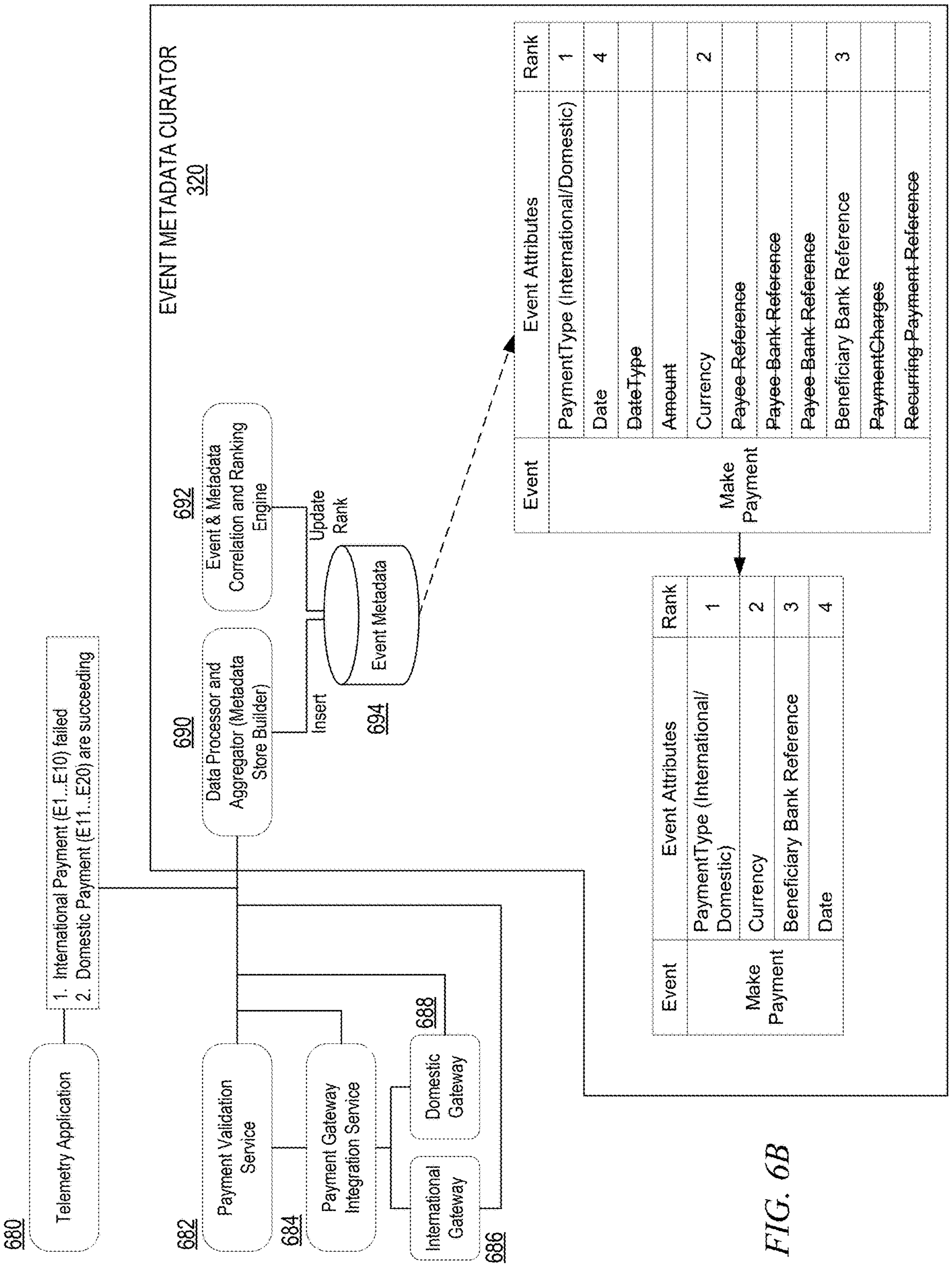
FIG. 6B is an example diagram illustrating an example of event data curation in accordance with one illustrative embodiment.

FIG. 6B is an example diagram illustrating an example operation of the ERMC with regard to a payment processing system as an example. As shown in FIG. 6B, a telemetry application 680 monitors an event processing pipeline for international payments having events E1 through E10, which in this example has failed. The telemetry application 680 further monitors a domestic payments event processing pipeline having events E11 through E20 which is succeeding. The event processing pipelines having a payment validation service 682, payment gateway integration service 684, and respectively international gateway 686 and domestic gateway 688. Logs of events E1 to E20 are generated by payment validation service 682 and payment gateway integration service 684 and the events are sent to respective ones of international gateway 686 and domestic gateway 688, which also generate logs. The logs are provided to the data processor and aggregator, or metadata store builder 690 of the ERMC 320. The data processor and aggregator, or metadata store builder 690 generates an event metadata store in event metadata storage 694. An event and metadata correlation and ranking engine 692 of the ERMC 320 may generate and/or update a ranking of event metadata based on a ranking and scoring of the metadata and filtering as previously described above.

The tables of FIG. 6B illustrate the event metadata for an event "MakePayment" along with a corresponding ranking. Event metadata having strikethrough are metadata attributes whose scoring is not sufficient to include as metadata attributes that have sufficient propensity to cause anomalies, e.g., slowdowns/failures, and thus, do not have a corresponding ranking. The other metadata attributes have a relative ranking based on their respective scores as generated by the event and metadata correlation and ranking engine 692. Thus, a subset of the event attributes for the "MakePayment" event is identified as a ranked listing of event attributes for use in identifying anomalies caused by the corresponding event, e.g., for the depicted example, the event metadata attributes comprise, in this particular ranked order, Payment Type (Rank 1), Currency (Rank 2), Beneficiary Bank Reference (Rank 3), and Date (Rank 4).

Figure 7A:
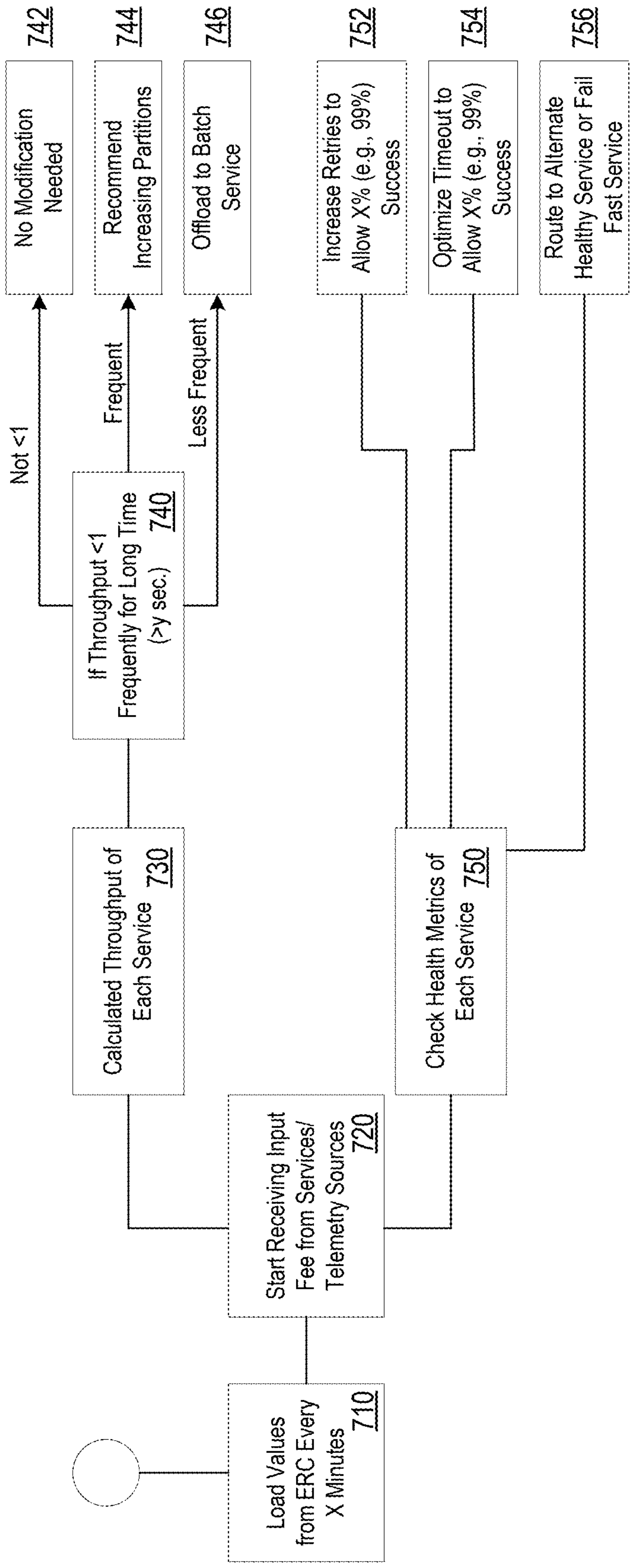
FIG. 7A is a flowchart outlining an example operation of a fault circuit interrupt machine (FCIM) in accordance with one illustrative embodiment.

FIG. 7A is a flowchart outlining an example operation of a fault circuit interrupt machine (FCIM) in accordance with one illustrative embodiment. As shown in FIG. 7A, the FCIM service loads values from the event resiliency configuration (ERC) system every x minutes (step 710). The FCIM service starts getting an input feed from all services/telemetry for errors happening in real-time (step 720). The throughput of each service of the event processing pipeline is continuously calculated (step 730). A determination is made as to whether the throughput is frequently or less frequently below a threshold throughput for a predetermined period of time, e.g., y seconds (step 740). If the throughput is not frequently or less frequently below the threshold throughput, then no modification to the event processing is necessary (step 742). If the throughput is frequently below the threshold throughput, the FCIM service may recommend increasing partitions, e.g., P1-P4, of the particular service (step 744). If the throughput is less frequently below the threshold throughput, the FCIM service may offload event messages for batch processing (step 746).

At substantially a same time, the FCIM service continuously checks the health metrics of each service (step 750), where thee "services" are functional services such as a payment service or the like, and each service may be represented as a stage in the pipeline. In some cases, a service may have multiple stages, e.g., in a payment service, a first step can be to check fraud probability, a second step may be to check a balance, and a third stage may be to do the payment, with each of these stages being part of the same overall service, or may be separate services. The throughput of a service may be measured using various metrics such as number of requests per unit time, with appropriate thresholds being predetermined to determine whether a service is health, unhealthy, intermittently failing, slowing down, failing frequently, or the like.

If the health of the service is intermittent failing, e.g., failing less than or equal to a predetermined threshold amount of the time, e.g., failing less than or equal to z percent, then the number of retries are increased to allow X percent, e.g., 99%, successful processing of event messages (step 752). If the health of the service is intermittent slowness, e.g., timeout equal to or less than z percent, then the timeout is optimized to allow X percent, e.g., 99%, successful processing of event messages (step 754). If the service is unhealth, e.g., failings greater than z percent, then the FCIM may route event messages to an alternate health service or cause the service to fail fast (step 756). It should be appreciated that the values of x, y, and z are configurable at the FCIM level or at the service level. Moreover, it should be appreciated that while step 756 may route to a single alternate healthy service, in some illustrative embodiments, the alternate healthy service may in fact comprise a plurality of alternate healthy services and event messages may be distributed to more than one of these healthy alternate healthy services.

FIG. 7B is an example FCIM control table in accordance with one illustrative embodiment. The fields of the FCIM control table may be populated by user resiliency configuration information provided by a provider of the event driven architecture being monitored by the event resiliency framework of the illustrative embodiments as well as configuration information for the event processing pipeline(s). For example, the user resiliency configuration information may be provided via the ERC, which provides users with flexibility to configure resiliency behavior per their requirements and use cases (per event type). For example, for each individual service, the user may specify resiliency configuration information including an alternate service to use, a batch service to use, a fail fast service to use, a minimum number of retries, a maximum number of retries, a timeout minimum value, and a timeout maximum value.

The particular example shown in FIG. 7B corresponds to the example of FIG. 6B with regard to the two processing pipelines for international and domestic payments. As shown in FIG. 7B, the FCIM control table comprises, for each pipeline 1 and 2, individual services 760 are specified and corresponding alternate services 763 are specified. Moreover, the services for handling batch offload 764 are also specified. In addition, a fail fast service 766 is specified which clears the event messages from the pipeline. Furthermore, the range of retries 768, timeout 770, and throughput threshold conditions 772 may be specified. These values of fields 768-772 may be modified dynamically in response to FCIM determinations of responsive actions in accordance with steps of the operation shown in FIG. 7A. The FCIM control table may be used by the FCIM to perform responsive actions in response to dynamic conditions of the pipelines being detected/predicted by the mechanisms of the illustrative embodiments. That is, based on the information stored in the FCIM control table, circuit connections may be modified based on dynamic conditions.

Figure 7C:
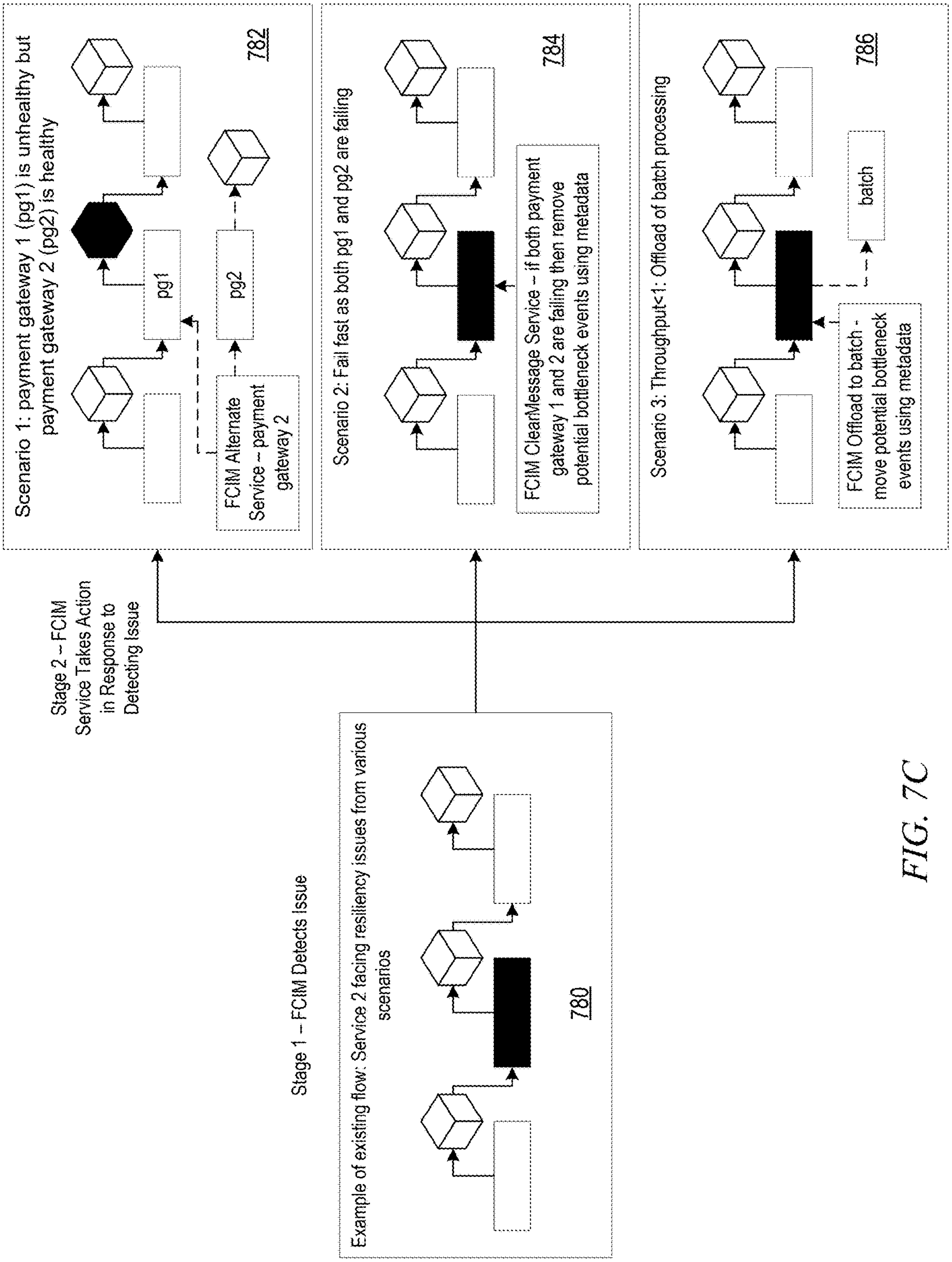
FIG. 7C is a diagram illustrating three example scenarios of fault circuit interrupt machine operation in accordance with one illustrative embodiment.

FIG. 7C is a diagram illustrating three example scenarios of FCIM operation in accordance with one illustrative embodiment. As shown in FIG. 7C, the FCIM detects an issue in a stage (or service) of the pipeline, e.g., service 2 in the example is facing resiliency issues from various scenarios 780. In a first scenario 782, the FCIM service takes action per the flowchart shown in FIG. 7A and determines that the payment gateway 1 is unhealthy, but that payment gateway 2 is health. As a result, the FCIM service routes event processing from the payment gateway 1 to the payment gateway 2 by moving event messages to payment gateway 2 to avoid the slowdown of processing at the payment gateway 1.

In a second scenario 784, it is determined that both payment gateway 1 and payment gateway 2 are both failing. Thus, the FCIM determines to fail fast the payment gateway 1 to remove the bottleneck events. In a third scenario 786, it is determined that the throughput is less than a predetermined threshold for a given period of time. In response, the FCIM offloads event messages to an offline batch processing service in order to move potential bottleneck events. In the second and third scenarios, the particular events to fail or offload may be determined based on event metadata and metadata ranking as performed by the mechanisms of the illustrative embodiments as discussed previously.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, in a data processing system, for generating a holistic view of an event processing pipeline of an event driven architecture, the computer-implemented method comprising:

performing curation of runtime information from components of the event processing pipeline, wherein the runtime information comprises real-time runtime metrics, aggregated logs of the components of the event processing pipeline, event tracing data structures, and configuration information of the components of the event processing pipeline;

correlating the real-time runtime metrics, the aggregated logs, and the event tracing data structures of the curated runtime information to generate correlated runtime data;

processing, by predictive models and predictive analytics, the correlated runtime data to predict one or more anomalies in the components of the event processing pipeline, wherein the processing of the correlated runtime data comprises:

identifying an event outlier based on at least one of performance indicators or success rate key performance indicators;

identifying, from the runtime information, telemetry data corresponding to the event outlier and a set of logs of a set of components of the event processing pipeline, wherein the set of components is involved in event processing of the event outlier, the aggregated logs include the set of logs, and the components include the set of components;

analyzing the telemetry data and the set of logs to identify metadata attributes associated with the event outlier;

executing an associativity scoring model on the metadata attributes to rank and order the metadata attributes based on a propensity to cause failures;

generating a finalized ranked listing of the metadata attributes based on the ranking and the ordering of the metadata attributes; and predicting the one or more anomalies based on the finalized ranked listing of the metadata attributes;

processing, by a fault circuit interrupt machine (FCIM), the predicted one or more anomalies based on a user resiliency configuration to determine one or more recommended event resiliency remediation actions for addressing the predicted one or more anomalies; and generating and outputting a graphical user interface comprising a real-time holistic view of the components of the event processing pipeline based on the correlated runtime data, the predicted one or more anomalies, and the determined one or more recommended event resiliency remediation actions.

2. The computer-implemented method of claim 1, wherein one or more elements of the real-time holistic view, corresponding to the components of the event processing pipeline, are rendered with attributes that distinguish a first element of the one or more elements from a second element of the one or more elements, and wherein the first element is distinguished from the second element based on a type of the predicted one or more anomalies, and severity of the predicted one or more anomalies, associated with the components corresponding to the one or more elements.

3. The computer-implemented method of claim 1, wherein the user resiliency configuration maps one or more specific use cases, corresponding to attributes of the event processing pipeline, with the predicted one or more anomalies, and the user resiliency configuration specifies one or more of the recommended event resiliency remediation actions corresponding to each of the one or more specific use cases and the predicted one or more anomalies.

4. The computer-implemented method of claim 1, wherein the executing of the associativity scoring model further comprises filtering out the metadata attributes that have a rank below a predetermined threshold rank.

5. The computer-implemented method of claim 1, wherein the predicting of the one or more anomalies based on the finalized ranked listing of the metadata attributes comprises processing the finalized ranked listing of the metadata attributes, along with component health metrics for the components of the event processing pipeline, as input to a trained machine learning computer model that predicts one or more of a slowdown buildup in the event processing pipeline, a failure of a component of the components in the event processing pipeline, or a root cause of an anomaly of the predicted one or more anomalies in the event processing pipeline.

6. The computer-implemented method of claim 1, wherein the FCIM causes a recommended event resiliency remediation action of the one or more recommended event resiliency remediation actions to be executed by at least one of:

moving one or more event messages to a functionally compliant alternative event processing pipeline based on a type of identified event metadata, selectively failing event message processing of selected event messages based on a specific identified event metadata of event messages causing slowdown or failures in the event processing pipeline, or selectively offload event messages for offline batch processing based on the specific identified event metadata of the event messages causing the slowdown or the failures in the event processing pipeline.

7. The computer-implemented method of claim 1, wherein the real-time holistic view of the components of the event processing pipeline is updated with annotations or modifications to textual or graphical attributes in real-time as new runtime information is curated and correlated.

8. The computer-implemented method of claim 1, wherein the predicted one or more anomalies are predicted slowdowns in processing of messages through the event processing pipeline or predicted failures of a component of the components of the event processing pipeline.

9. The computer-implemented method of claim 1, wherein the real-time holistic view of the components of the event processing pipeline comprises annotations specifying types of the predicted one or more anomalies associated with elements of the real-time holistic view and probable root causes of the predicted one or more anomalies associated with the elements of the real-time holistic view.

10. A computer program product comprising a computer readable storage medium having a computer readable program stored therein, wherein the computer readable program, when executed on a computing device, causes the computing device to:

perform curation of runtime information from components of an event processing pipeline, wherein the runtime information comprises real-time runtime metrics, aggregated logs of the components of the event processing pipeline, event tracing data structures, and configuration information of the components of the event processing pipeline;

correlate the real-time runtime metrics, the aggregated logs, and the event tracing data structures of the curated runtime information to generate correlated runtime data;

process, by predictive models and predictive analytics, the correlated runtime data to predict one or more anomalies in the components of the event processing pipeline, wherein the process of the correlated runtime data comprises:

identification of an event outlier based on at least one of performance indicators or success rate key performance indicators;

identification, from the runtime information, of telemetry data corresponding to the event outlier and a set of logs of a set of components of the event processing pipeline, wherein the set of components is involved in event processing of the event outlier, the aggregated logs include the set of logs, and the components include the set of components;

analysis of the telemetry data and the set of logs to identify metadata attributes associated with the event outlier;

execution of an associativity scoring model on the metadata attributes to rank and order the metadata attributes based on a propensity to cause failures;

generation of a finalized ranked listing of the metadata attributes based on the rank and the order of the metadata attributes; and prediction of the one or more anomalies based on the finalized ranked listing of the metadata attributes;

process, by a fault circuit interrupt machine (FCIM), the predicted one or more anomalies based on a user resiliency configuration to determine one or more recommended event resiliency remediation actions for addressing the predicted one or more anomalies; and generate and output a graphical user interface comprising a real-time holistic view of the components of the event processing pipeline based on the correlated runtime data, the predicted one or more anomalies, and the determined one or more recommended event resiliency remediation actions.

11. The computer program product of claim 10, wherein one or more elements of the real-time holistic view, corresponding to the components of the event processing pipeline, are rendered with attributes that distinguish a first element of the one or more elements from a second element of the one or more elements, and wherein the first element is distinguished from the second element based on a type of the predicted one or more anomalies, and severity of the predicted one or more anomalies, associated with the components corresponding to the one or more elements.

12. The computer program product of claim 10, wherein the user resiliency configuration maps one or more specific use cases, corresponding to attributes of the event processing pipeline, with the predicted one or more anomalies, and the user resiliency configuration specifies one or more of the recommended event resiliency remediation actions corresponding to each of the one or more specific use cases and the predicted one or more anomalies.

13. The computer program product of claim 10, wherein the execution of the associativity scoring model further comprises filtering out the metadata attributes that have a rank below a predetermined threshold rank.

14. The computer program product of claim 10, wherein the prediction of the one or more anomalies based on the finalized ranked listing of the metadata attributes comprises process of the finalized ranked listing of the metadata attributes, along with component health metrics for the components of the event processing pipeline, as input to a trained machine learning computer model that predicts one or more of a slowdown buildup in the event processing pipeline, a failure of a component of the components in the event processing pipeline, or a root cause of an anomaly of the predicted one or more anomalies in the event processing pipeline.

15. The computer program product of claim 10, wherein the FCIM causes a recommended event resiliency remediation action of the one or more recommended event resiliency remediation actions to be executed by at least one of:

moving one or more event messages to a functionally compliant alternative event processing pipeline based on a type of identified event metadata, selectively failing event message processing of selected event messages based on a specific identified event metadata of event messages causing slowdown or failures in the event processing pipeline, or selectively offload event messages for offline batch processing based on the specific identified event metadata of the event messages causing the slowdown or the failures in the event processing pipeline.

16. The computer program product of claim 10, wherein the real-time holistic view of the components of the event processing pipeline is updated with annotations or modifications to textual or graphical attributes in real-time as new runtime information is curated and correlated.

17. The computer program product of claim 10, wherein the predicted one or more anomalies are predicted slowdowns in processing of messages through the event processing pipeline or predicted failures of a component of the components of the event processing pipeline.

18. An apparatus, comprising:

at least one processor; and at least one memory coupled to the at least one processor, wherein the at least one memory comprises instructions which, when executed by the at least one processor, cause the at least one processor to:

perform curation of runtime information from components of an event processing pipeline, wherein the runtime information comprises real-time runtime metrics, aggregated logs of the components of the event processing pipeline, event tracing data structures, and configuration information of the components of the event processing pipeline;

correlate the real-time runtime metrics, the aggregated logs, and the event tracing data structures of the curated runtime information to generate correlated runtime data;

process, by predictive models and predictive analytics, the correlated runtime data to predict one or more anomalies in the components of the event processing pipeline, wherein the process of the correlated runtime data comprises:

identification of an event outlier based on at least one of performance indicators or success rate key performance indicators;

identification, from the runtime information, of telemetry data corresponding to the event outlier and a set of logs of a set of components of the event processing pipeline, wherein the set of components is involved in event processing of the event outlier, the aggregated logs include the set of logs, and the components include the set of components;

analysis of the telemetry data and the set of logs to identify metadata attributes associated with the event outlier;

execution of an associativity scoring model on the metadata attributes to rank and order the metadata attributes based on a propensity to cause failures;

generation of a finalized ranked listing of the metadata attributes based on the rank and the order of the metadata attributes; and prediction of the one or more anomalies based on the finalized ranked listing of the metadata attributes;

process, by a fault circuit interrupt machine (FCIM), the predicted one or more anomalies based on a user resiliency configuration to determine one or more recommended event resiliency remediation actions for addressing the predicted one or more anomalies; and generate and output a graphical user comprising interface a real-time holistic view of the components of the event processing pipeline based on the correlated runtime data, the predicted one or more anomalies, and the determined one or more recommended event resiliency remediation actions.

* * * * *